United States Patent
Fenner et al.

(10) Patent No.: US 9,729,427 B2
(45) Date of Patent: Aug. 8, 2017

(54) METHOD AND SYSTEM FOR ROUTE HARDWARE PROGRAMMING IN NETWORK DEVICES

(71) Applicant: Arista Networks, Inc., Santa Clara, CA (US)

(72) Inventors: William Fenner, Santa Clara, CA (US); Prakash Badrinaryananan, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 91 days.

(21) Appl. No.: 14/707,740

(22) Filed: May 8, 2015

(65) Prior Publication Data
US 2016/0330102 A1 Nov. 10, 2016

(51) Int. Cl.
H04L 12/28 (2006.01)
H04L 12/755 (2013.01)
H04L 12/771 (2013.01)
H04L 12/751 (2013.01)
H04L 12/741 (2013.01)
H04L 12/841 (2013.01)
H04L 12/721 (2013.01)

(52) U.S. Cl.
CPC ............ *H04L 45/021* (2013.01); *H04L 45/02* (2013.01); *H04L 45/54* (2013.01); *H04L 45/56* (2013.01); *H04L 47/28* (2013.01); *H04L 45/08* (2013.01); *H04L 45/12* (2013.01)

(58) Field of Classification Search
CPC ......... H04L 45/02; H04L 45/72; H04L 43/08; H04L 43/106; H04L 43/10; H04L 47/20; H04L 43/026; H04L 45/38; H04L 45/42; H04L 45/44; H04L 49/25; H04L 49/9068
See application file for complete search history.

(56) References Cited

U.S. PATENT DOCUMENTS

| | | | |
|---|---|---|---|
| 2008/0089348 A1* | 4/2008 | Appanna ................. | H04L 45/02 370/401 |
| 2013/0265881 A1* | 10/2013 | Filsfils ................ | H04L 43/0805 370/241 |
| 2014/0119379 A1* | 5/2014 | Liang .................. | H04L 12/4625 370/401 |

* cited by examiner

*Primary Examiner* — Melanie Jagannathan
*Assistant Examiner* — Najeebuddin Ansari
(74) *Attorney, Agent, or Firm* — Chamberlain Krdlicka (57) ABSTRACT

A method for programming route hardware in network devices. The method includes: receiving, by a network device, route updates, selecting from the route updates, a set of selected routes to be used for routing, assigning multiple timestamps to the set of selected routes, programming the set of selected routes into a software-implemented forwarding information base (FIB), segmenting the set of selected routes in the software-implemented FIB into at least a first batch of routes and a second batch of routes, programming the first batch of routes into a hardware-implemented FIB, after the programming, determining a last timestamp, where the last time stamp is the oldest timestamp of the timestamps where all routes associated with the last timestamp have been successfully programmed into the hardware-implemented FIB, and advertising all routes of the first batch that are associated with a timestamp that is no older than the last timestamp.

17 Claims, 6 Drawing Sheets

METHOD AND SYSTEM FOR ROUTE HARDWARE PROGRAMMING IN NETWORK DEVICES

BACKGROUND

Border network devices such as routers or multilayer switches are network devices that are used to manage the flow of data between different segments of a network. Border network devices may exchange routing information in order to learn about available routes.

SUMMARY

In general, in one aspect, the invention relates to a method for route hardware programming in network devices. The method comprises receiving, by a network device, route updates from a peer network device, selecting from the route updates, by a routing information base (RIB) agent, a set of selected routes to be used for routing, assigning, by the RIB agent, a plurality of timestamps to the set of selected routes, programming, by the RIB agent, the set of selected routes into a software-implemented forwarding information base (FIB), segmenting, by a forwarding information base (FIB) agent, the set of selected routes in the software-implemented FIB into at least a first batch of routes and a second batch of routes, programming, by the FIB agent, the first batch of routes into a hardware-implemented FIB, after the programming, determining a last timestamp, wherein the last time stamp is the oldest timestamp of the plurality of timestamps where all routes associated with the last timestamp have been successfully programmed into the hardware-implemented FIB, sending to the RIB agent, by the FIB agent, the last timestamp, and advertising, by the RIB agent, all routes of the first batch that are associated with a timestamp that is no older than the last timestamp.

In general, in one aspect, the invention relates to a network device that comprises a routing information base (RIB) agent and a forwarding information base (FIB) agent, wherein the network device receives route updates from a peer network device, wherein the RIB agent selects, from the route updates, a set of selected routes to be used for routing, wherein the RIB agent assigns a plurality of timestamps to the set of selected routes, wherein the RIB agent programs the set of selected routes into a software-implemented FIB, wherein the FIB agent segments the set of selected routes in the software-implemented FIB into at least a first batch of routes and a second batch of routes, wherein the FIB agent programs the first batch of routes into a hardware-implemented FIB, and wherein, after the programming, the FIB agent determines a last timestamp, wherein the last time stamp is the oldest timestamp of the plurality of timestamps where all routes associated with the last timestamp have been successfully programmed into the hardware-implemented FIB, the FIB agent sends the last timestamp to the RIB agent, and the RIB agent advertises all routes of the first batch that are associated with a timestamp that is no older than the last timestamp.

In general, in one aspect, the invention relates to a non-transitory computer readable medium comprising instructions, that enable a network device to receive route updates from a peer network device, select from the route updates, by a routing information base (RIB) agent, a set of selected routes to be used for routing, assign, by the RIB agent, a plurality of timestamps to the set of selected routes, program, by the RIB agent, the set of selected routes into a software-implemented forwarding information base (FIB), segment, by a forwarding information base (FIB) agent, the set of selected routes in the software-implemented FIB into at least a first batch of routes and a second batch of routes, program, by the FIB agent, the first batch of routes into a hardware-implemented FIB, after the programming, determine, by the FIB agent, a last timestamp, wherein the last time stamp is the oldest timestamp of the plurality of timestamps where all routes associated with the last timestamp have been successfully programmed into the hardware-implemented FIB, send to the RIB agent, by the FIB agent, the last timestamp, and advertise, by the RIB agent, all routes of the first batch that are associated with a timestamp that is no older than the last timestamp.

Other aspects of the invention will be apparent from the following description and the appended claims.

DETAILED DESCRIPTION

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-6C, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to configuring a network device to perform routing of data packets in a network. More specifically, one or more embodiments of the invention include initializing the network device in preparation for activating the network device's routing functionality. When a network device in accordance with one or more embodiments of the invention powers on, the network device's knowledge about the surrounding network and available routes may be incomplete. For example, there may be no route information for certain destination IP address ranges, and/or the cost of the routes the network device is aware of may be higher than necessary, i.e. shorter routes, requiring fewer "hops" to a destination, may exist. Therefore, during a boot phase of the network device, occurring for example when the network device is powered on, the network device in accordance with one or more embodiments of the invention may gather route information from peer network devices in order to complete the network device's knowledge about the surrounding network environment and available routes.

In one or more embodiments of the invention, network devices may use the border gateway protocol (BGP) to exchange route information. A network device may establish BGP sessions with peer BGP network devices, i.e. it may connect to other BGP-capable network devices. During a convergence phase, the network device may receive route updates, i.e. information about available routes to network destinations, from some or all of the peer BGP network devices with which the network device has established BGP sessions. The network device may need to process the received routes before being able to send packets over these newly learned routes. Processing the received routes may include writing the routes into a hardware-implemented forwarding information base (hardware FIB) that the network device may rely on in order to make routing decisions when packets are processed. The hardware FIB may be implemented by hardware optimized for high-speed lookups of routes, thus enabling rapid forwarding of packets to the next hop. Subsequently, the network device may signal to other network devices that it may be able to send packets over the newly learned routes by advertising the newly learned routes to the peer network devices. In one or more embodiments of the invention, the network device may not advertise newly learned routes until the routes have been written to the hardware FIB in order to avoid scenarios where the network device may have to drop packets because the route over which the packets are to be sent has not been programmed into the hardware FIB at the time the packets are processed.

The following description describes some embodiments of the invention in which the network devices are routers. However, the invention is not limited to routers; rather embodiments of the invention may be extended to include other network devices (e.g. multi-layer switches).

Figure 1:
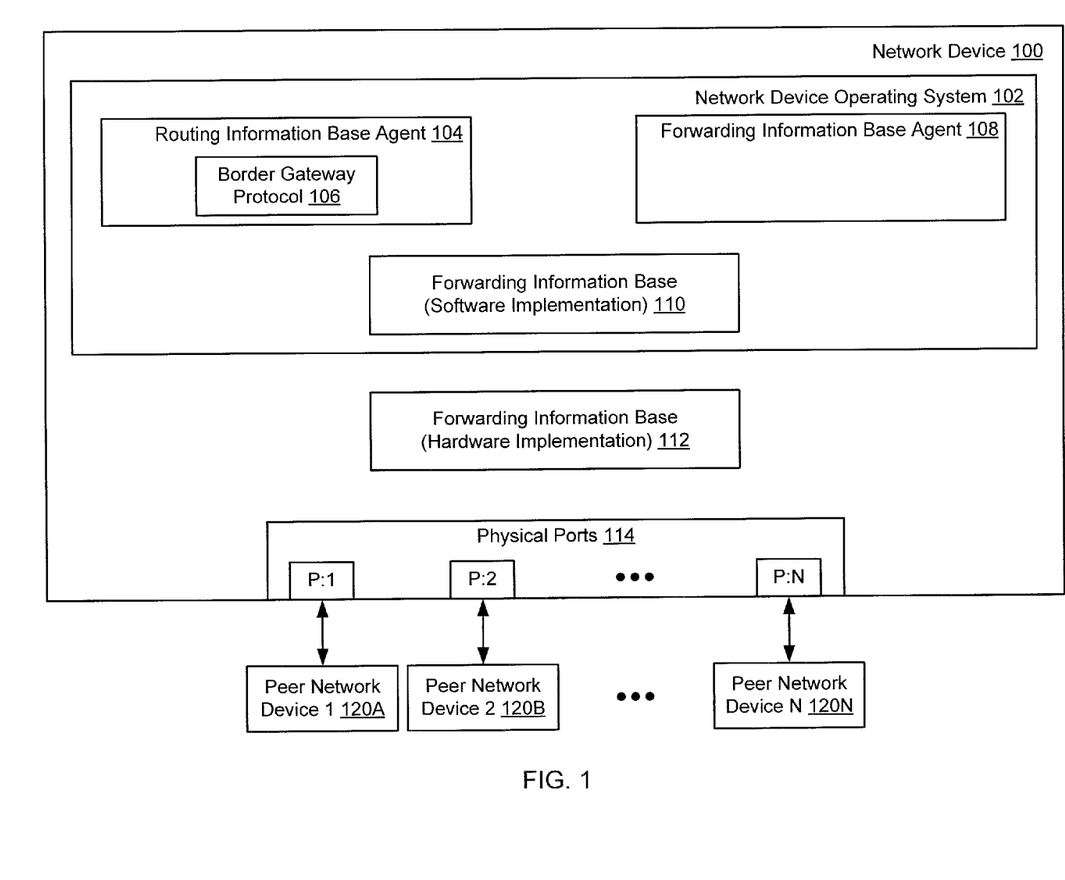
FIG. 1 shows a network device in accordance with one or more embodiments of the invention.

FIG. 1 shows a network device in accordance with one or more embodiments of the invention. In one embodiment of the invention, the network device (100) may be, for example, a router or a multilayer switch that includes executable instructions (stored on a non-transitory computer readable medium) and hardware (e.g., a processor, memory, persistent storage, etc.) configured to receive packets from network devices, process the packets, and send the packets to other network devices. In one embodiment of the invention, the network device (100) may include a network device operating system (OS) (102). The network device OS (102) is software that manages the hardware of the network device to provide functionality to the network device (e.g., functionality to implement methods shown in FIGS. 2-5) and may be executed on a processor (not shown). In one or more embodiments of the invention, the network OS (102) may host a routing information base (RIB) agent (104), an implementation of the border gateway protocol (BGP) (106) and a forwarding information base (FIB) agent (108). The BGP implementation (106) may be hosted by the RIB agent (104), as shown in FIG. 1, or it may exist outside the RIB agent (104). Further, the network device OS (102) may implement a software-implemented FIB (110). In one or more embodiments of the invention, the hardware of the network device (100) may include a hardware-implemented FIB (112) and multiple physical ports (114). The physical ports may connect the network device (100) to peer network devices (120A-120N), such as, for example, routers and/or multi-layer switches.

One skilled in the art will recognize that the architecture of a network device is not limited to the components shown in FIG. 1. For example, the network device may include additional processors and/or memory not shown in FIG. 1. Further, the number of ports and the number of peer network devices may vary depending on the requirements, the size and the topology of the network, without departing from the invention.

In one or more embodiments of the invention, the network device (100) may receive route updates from a peer network device, for example from peer network device 1 (120A) via physical port P:1 (114). The incoming route updates may be processed by the RIB agent (104) hosted by the network device's OS (102). The RIB agent (104) may receive the incoming route updates and may direct them to the implementation of the appropriate routing protocol, hosted by the RIB agent. In one embodiment of the invention, the border gateway protocol (BGP), hosted by the RIB agent, may be used to exchange route updates with peer network device. Accordingly, the implementation of BGP (106) may receive the incoming route updates, and may perform some initial processing such as, for example, the elimination of redundant routes.

In one or more embodiments of the invention, the RIB agent (104) and/or the BGP implementation (106), may select the routes to be written to the hardware FIB (112). Routes may be selected, for example, in order to eliminate redundant routes. In one embodiment of the invention, the RIB agent (104) may not directly write the selected routes into the hardware FIB (112). The RIB agent may instead write the selected routes into the software FIB (110). In one or more embodiments of the invention, the software FIB (110) may serve as a buffer for the hardware FIB (112), i.e. the software FIB (110) may temporarily store the route entries prior such entries being programmed into the hardware FIB (112). Accordingly, the hardware FIB (112) may be updated indirectly, by the RIB agent updating the software FIB (110). The FIB agent (108) may read the content of the software FIB (110), and write the content into the hardware FIB (112).

In one or more embodiments of the invention, the FIB agent may not be able to immediately write all the routes stored in the software FIB (110) to the hardware FIB (112). A route update sent by a peer network device may include, for example, more than 100,000 routes, whereas the FIB agent (108) may only process, for example, 100 entries at once. In one embodiment of the invention, the number of routes the FIB agent (108) may write into the hardware FIB (112) at once may be set such that the FIB agent (108) is capable of serving other competing requests it may receive. The number of routes the FIB agent (108) may write into the hardware FIB (112) at once may be a parameter configurable by the administrator of the network device (100), or it may be limited, for example, based on the amount of time it takes to write the entries. The FIB agent (108) may therefore split the routes stored in the software FIB (110) into batches including a limited number of routes that it may sequentially write to the hardware FIB (112).

As previously discussed, the network device (100) may need to delay advertising the routes to the peer network devices (120A-120N), until the routes have been successfully written to the hardware FIB (112). In one or more embodiments of the invention, the RIB agent (104) may be responsible for issuing route updates to the peer network devices (120A-120N). The RIB agent (104) may therefore need to be notified, by the FIB agent (108), about the routes that have been successfully written to the hardware FIB (112). Accordingly, the FIB agent (108) may communicate the routes that have been successfully written to the hardware FIB (112) to the RIB agent (104), and the RIB agent (104) may subsequently advertise these routes to the peer network devices (120A-120N).

FIGS. 2-5 show flowcharts in accordance with one or more embodiments of the invention, describing steps that may be performed by the RIB agent and the FIB agent in order to write newly obtained routes into the hardware FIB, and to subsequently advertise these routes to the peer network devices.

While the various steps in the flowcharts are presented and described sequentially, one of ordinary skill will appreciate that some or all of these steps may be executed in different orders, may be combined or omitted, and some or all of the steps may be executed in parallel. In one embodiment of the invention, the steps shown in FIGS. 2-5 may be performed in parallel with any other steps shown in FIGS. 2-5 without departing from the invention.

Figure 2:
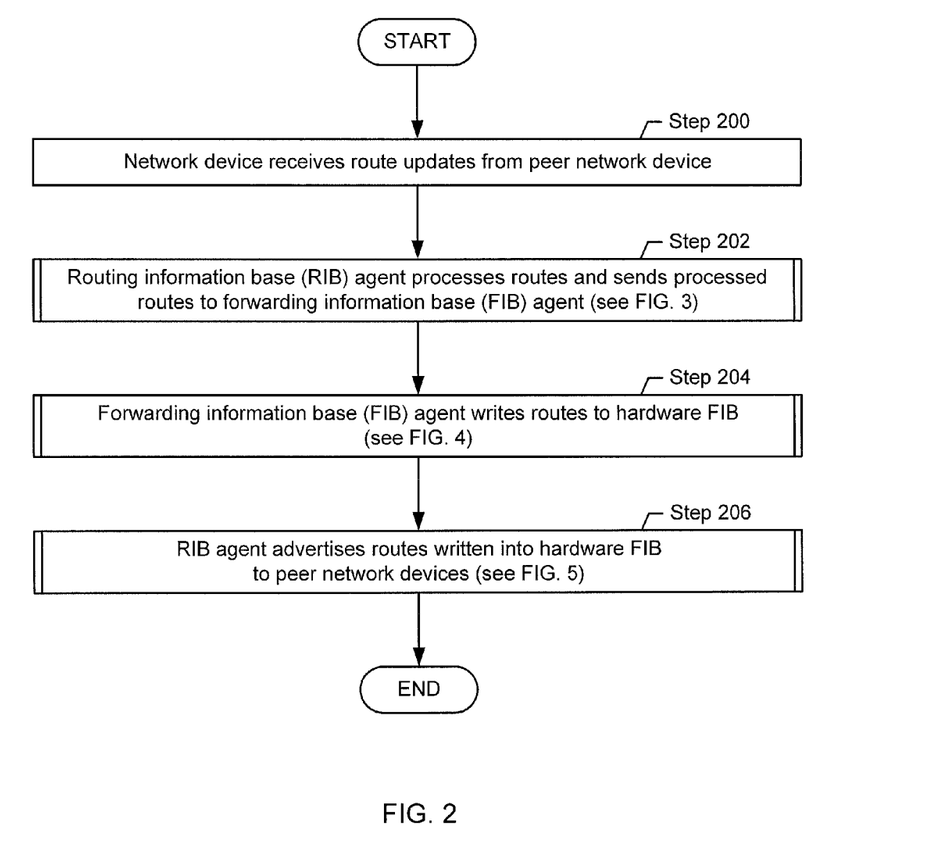
FIG. 2 shows a flowchart in accordance with one or more embodiments of the invention.

FIG. 2 shows a method for receiving route updates from a peer network device, processing the received routes, writing the routes to the hardware FIB, and advertising the routes written to the hardware FIB. A network device may receive route updates from multiple peer network devices, and/or a network device may receive route updates repeatedly from the same peer network device. Accordingly, the method described in FIG. 2 may be executed repeatedly, each time the network device receives route updates.

Turning to FIG. 2, in Step 200, the network device receives route updates from a peer network device. In Step 202, the routing information base (RIB) agent processes the received routes and sends the processed routes to the forwarding information base (FIB) agent. The details of Step 202 are described in FIG. 3. In Step 204, the FIB agent writes the routes to the hardware-implemented forwarding information base (hardware FIB). The details of Step 204 are described in FIG. 4. In Step 206, the RIB agent advertises the routes written into the hardware FIB to the peer network devices. The details of Step 206 are described in FIG. 5.

Figure 3:
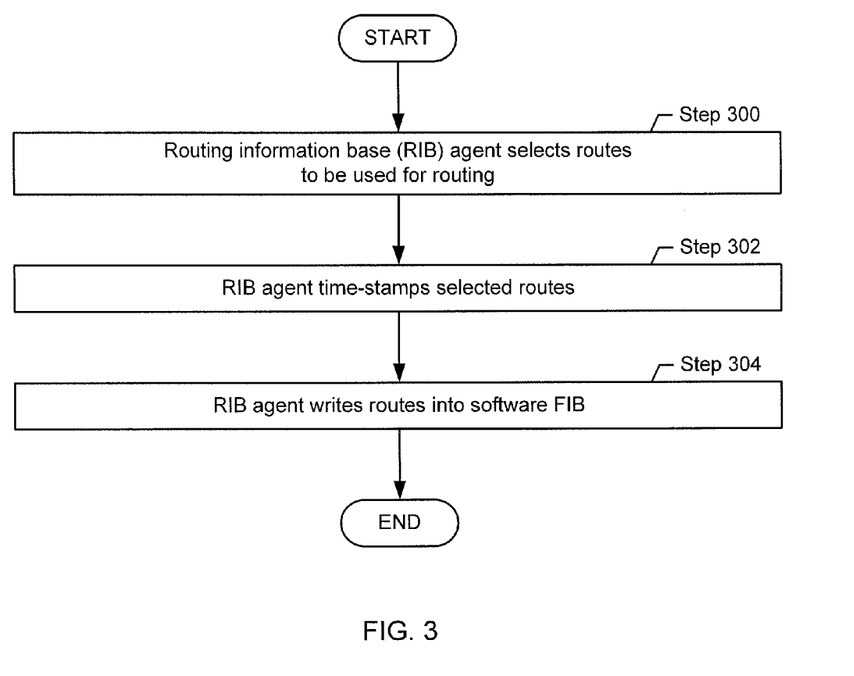
FIG. 3 shows a flowchart in accordance with one or more embodiments of the invention.

FIG. 3 shows a method for processing route updates received from a peer network device, and for forwarding the processed routes to the FIB agent, by the RIB agent. Turning to FIG. 3, in Step 300, the RIB agent selects the routes to be used for routing, from the routes received in a route update in Step 200. In one or more embodiments of the invention, the border gateway protocol (BGP) may be used to receive updates and to select the routes to be used by the network device for routing. Accordingly, the RIB agent may implement BGP. The RIB agent, using BGP, may select the routes to be used for routing based on a variety of configurable criteria. BGP may, for example, eliminate redundant routes based on the cost associated with the routes.

In Step 302, the RIB agent assigns timestamps to the selected routes (i.e., the routes selected in step 300). In one embodiment of the invention, timestamps may be assigned to individual routes, to subgroups of routes and/or a single timestamp may be assigned to the set of routes identified in step 300. In one embodiment of the invention, the number of routes in a subgroup of routes is configurable. For example, a group of routes that includes 10, 50, 1,000, etc., routes may be assigned a single time stamp. In one or more embodiments of the invention, timestamps may be associated with routes in such a manner as to preserve the order of the routes and/or the order of the subgroups of routes. A timestamp may be derived from a time, for example, the system time of the network device. Accordingly, a route or a group of routes may receive a timestamp representing the system time when the timestamp is associated to the route or subgroup of routes. Those skilled in the art will appreciate that the timestamp may have any level of precision that is appropriate to implement the invention. In one embodiment of the invention, the timestamp may be a number that is incremented each time it is associated with a route. For example, route 1 may be associated with timestamp (TS)=1, route 2 may have TS=2, etc.

In Step 304, the RIB agent writes the group of selected routes into the software-implemented forwarding information base (software FIB).

Figure 4:
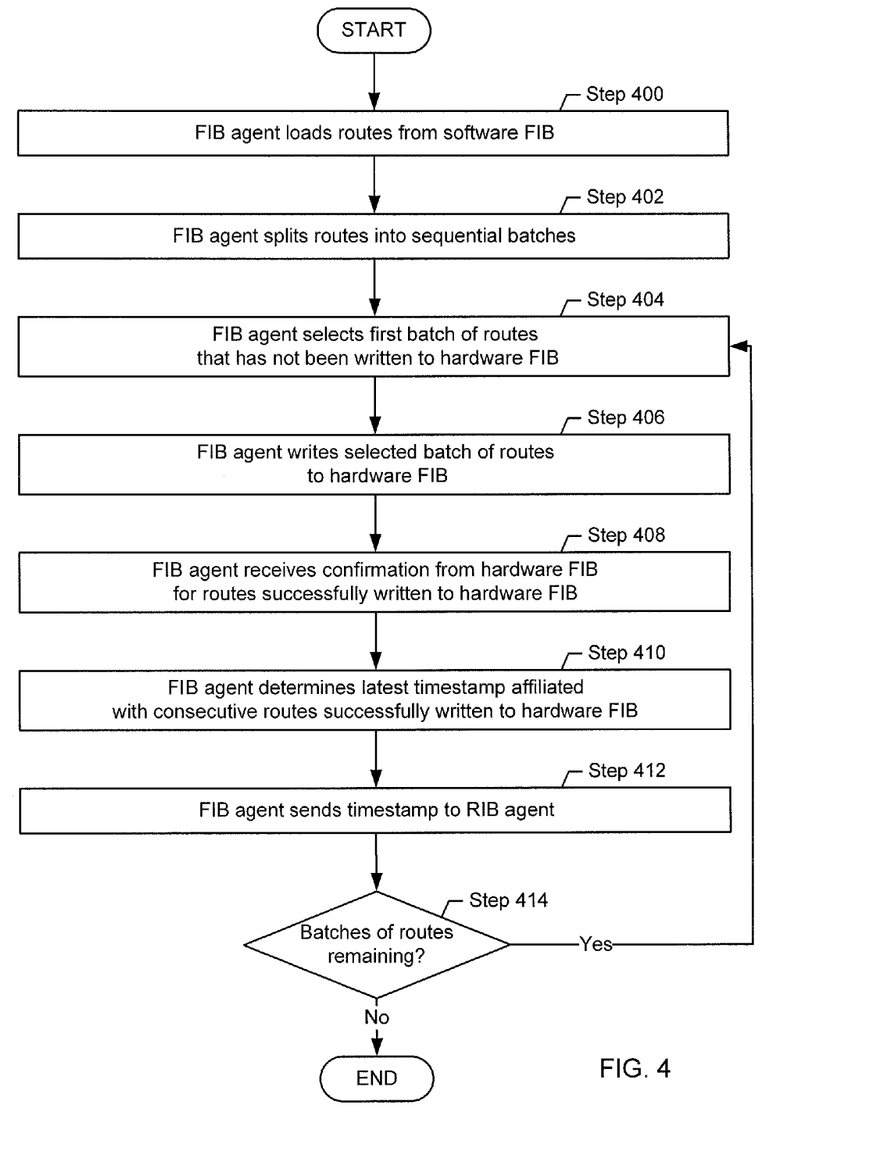
FIG. 4 shows a flowchart in accordance with one or more embodiments of the invention.

FIG. 4 shows a method for writing the routes stored in the software FIB into the hardware FIB.

Turning to FIG. 4, in Step 400, the FIB agent loads the routes stored in the software FIB, along with the timestamps. In Step 402, the FIB agent splits the routes loaded from the software FIB into sequential batches. The software FIB may hold, for example, more than 100,000 routes, whereas the FIB agent may processes the routes, for example, in batches of 100.

In Step 404, the FIB agent selects the first batch of routes that has not yet been written into the hardware FIB. The selected batch of routes may include the lowest timestamp of any of the routes in the group of selected routes that have not been programmed into the FIB. The size of the batch may be determined by the FIB agent. In Step 406, the FIB agent writes the selected batch of routes into the hardware FIB. The FIB agent writes the routes into the hardware FIB in the order they are stored in the batch. In Step 408, the hardware FIB acknowledges successfully written routes to the FIB agent.

In Step 410, the FIB agent determines the latest timestamp affiliated with the routes successfully written to the hardware FIB. In one embodiment of the invention, the FIB agent may first determine the last route of a series of consecutive routes successfully written to the hardware FIB. If, for example, routes 1-21 and routes 23-50 have been successfully written to the hardware FIB, but the writing of route 22 was unsuccessful, then the FIB agent may select route 21. The FIB agent may select route 50 only after route 22 has been successfully rewritten to the hardware FIB. In the event that the routes are not individually time stamped, the latest time stamp associated with any of the consecutive routes successfully written to the FIB may be used.

In Step 412, the FIB agent sends the timestamp, determined in Step 410, to the RIB agent in order to confirm that the route the timestamp is affiliated with and all routes prior to that route have been successfully written to the hardware FIB.

In Step 414, a determination is made about whether batches of routes, generated in Step 402, that have not been written to the hardware FIB remain. If no batches of unprocessed routes remain, the execution of the method described in FIG. 4 may be terminated. If a determination is made that additional batches of routes to be written to the hardware FIB remain, the method may return to Step 404.

Figure 5:
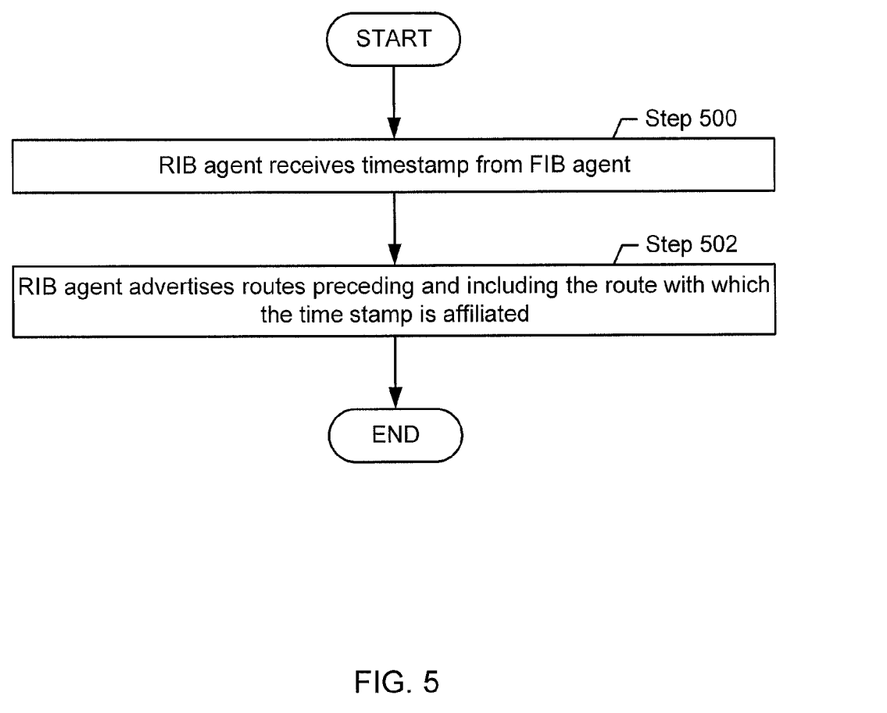
FIG. 5 shows a flowchart in accordance with one or more embodiments of the invention.

FIG. 5 shows a method for advertising routes that have been written to the hardware FIB to the peer network devices.

In Step 500, the RIB agent receives the timestamp sent by the FIB agent in Step 412. In Step 502, the RIB agent matches the received timestamp with the original timestamp produced in Step 302 and advertises those routes of the routes selected in Step 300 that precede or are equal to the timestamp.

Figure 6A:
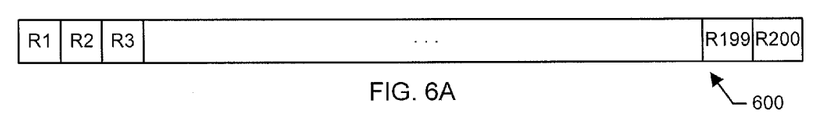
FIG. 6A-6C shows a set of routes that is processed in accordance with one or more embodiments of the invention.
Figure 6B:
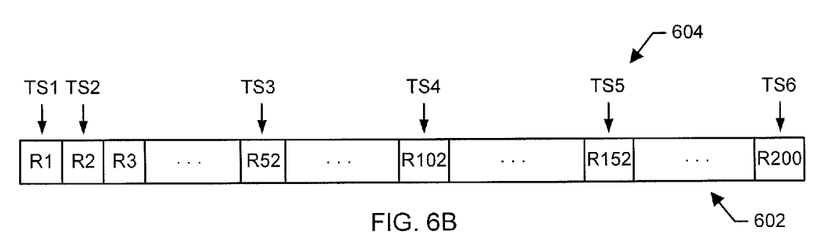
Figure 6C:
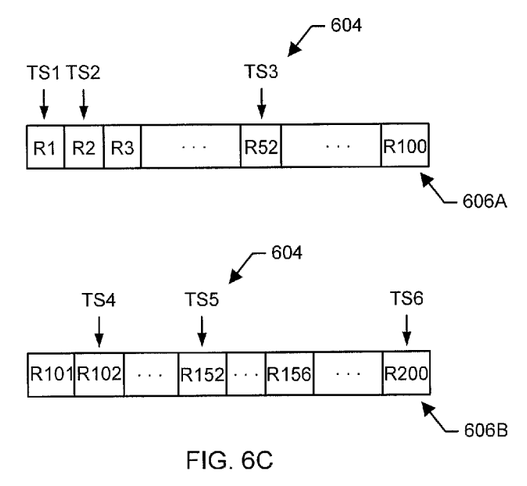

FIGS. 6A-6C show a set of routes in a scenario, where the set of route updates, received from a peer network device, is processed in accordance with one or more embodiments of the invention. The use case scenario described below is intended to provide an example of the method for route hardware programming in network devices, described in FIGS. 2-5. The use case scenario is based on the set of routes received from a peer network device, shown in FIG. 6A and is for illustrative purposes only. The method described by FIGS. 2-5 is not limited to the set or routes shown in FIG. 6A, but rather is universally applicable to any set of routes received by the network device from a peer network device.

Example Use Case 1

Consider a scenario in which the network device, implementing the method shown in FIG. 2 receives a set of routes from a peer network device during a route update (Step 200). The set of routes (600) includes 200 individual route entries. Each route entry describes a complete route. In the example, the routing information base (RIB) agent selects all routes to be used for routing (Step 300). Accordingly, the selected routes (602), shown in FIG. 6B, are identical to the set of routes (600) received during the route update. Subsequently, the RIB agent applies time-stamps (604) to the routes entries (Step 302). In the example, the RIB agent assigns a time-stamp to the first route, R1, to the second route, R2, and subsequently to every $50^{th}$ route of the route update. The RIB agent also assigns a timestamp to the last route of the route update. Accordingly, routes R1, R2, R52, R102, R152 and R200 are assigned timestamps TS1-TS6, respectively (FIG. 6B).

The RIB agent writes the routes (602) into the software forwarding information base (FIB) of the network device (Step 304), from where the FIB agent loads the routes (602), along with the timestamps (Step 400). The FIB agent, splits the routes (602) into batches of routes (606A, 606B) to be written to the hardware FIB by the FIB agent. In the example, a batch is configured to include 100 routes. Accordingly, the routes (602) are split into two batches.

The FIB agent selects the first batch of routes (606A) (Step 404) and writes the first batch of routes to the hardware FIB in the order they are stored in the batch (Step 406). The FIB agent receives a confirmation from the hardware FIB that all routes have been successfully written to the hardware FIB (Step 408). Subsequently, the FIB agent determines that the last route of a set of consecutive routes of the first batch of routes (606A), successfully written to the hardware FIB, that had a timestamp assigned in Step 302 is R52. The FIB agent determines that the timestamp assigned to R52 is TS3 (Step 410). Accordingly, the FIB agent sends timestamp TS3 to the RIB agent (Step 412). The RIB agent receives timestamp TS3 from the RIB agent (Step 500) and subsequently advertises all routes preceding and including the route with which TS3 is affiliated, i.e. routes 1-52 (Step 502). The peer network devices, becoming aware of the network device supporting routing for routes 1-52 may begin using these routes by sending packets on one or more of these routes, via the network device. The network device may receive those packets, and determine, for each packet, based on the entries in the hardware FIB, a suitable next hop (i.e. a next network device on the route, toward the destination of the packet), and send the packet to the next hop.

In the meantime, the execution of the method described in FIG. 4 continues. The FIB agent detects that a second batch of routes (606B) remains to be written to the hardware FIB (Step 414). The FIB agent therefore returns to Step 404 and selects the second batch of routes (606B) for processing. The FIB agent writes the second batch of routes to the hardware FIB in the order the routes are stored in the batch (Step 406). The FIB agent receives a confirmation from the hardware FIB that all routes have been successfully written to the hardware FIB (Step 408). Subsequently, the FIB agent determines that the last route of a set of consecutive routes of the second batch of routes (606A), successfully written to the hardware FIB, is R200, and that the timestamp affiliated with R200 is TS6 (Step 410). Accordingly, the FIB agent sends timestamp TS6 to the RIB agent (Step 412). The RIB agent receives timestamp TS6 from the RIB agent (Step 500) and subsequently advertises all routes preceding and including the route with which TS6 is affiliated, i.e. routes 1-200 (Step 502). The peer network devices, becoming aware of the network device supporting routing for routes 1-200, may begin using these routes by sending packets on one or more of these routes, via the network device.

Example Use Case 2

In a second example use case scenario, the method described in FIG. 2 proceeds as described by example use case 1 and completes the processing of the first batch of routes (606A) and subsequently publishes routes 1-52, as previously described. The FIB agent detects that a second batch of routes (606B) remains to be written to the hardware FIB (Step 414), The FIB agent therefore returns to Step 404 and selects the second batch of routes (606B) for processing. The FIB agent writes the second batch of routes to the hardware FIB in the order the routes are stored in the batch (Step 406). The writing of route R156 to the hardware FIB fails, and accordingly the FIB agent does not receive a confirmation from the hardware FIB that routes R156 has been successfully written to the hardware FIB (Step 408). Subsequently, the FIB agent determines that the last route of a set of consecutive routes of the second batch of routes (606B), successfully written to the hardware FIB, that has a timestamp assigned in Step 302 is R152. The FIB agent determines that the timestamp assigned to R152 is TS5 (Step 410). The RIB agent receives timestamp TS5 from the RIB agent (Step 500) and subsequently advertises all routes preceding and including the route with which TS5 is affiliated, i.e. routes 1-152 (Step 502). The peer network devices becoming aware of the network device supporting routing for routes 1-152 may begin using these routes by sending packets on one or more of these routes, via the network device. The network device may receive those packets, and determine, for each packet, based on the entries in the hardware FIB, a suitable next hop (i.e. a next network device on the route, toward the destination of the packet), and send the packet to the next hop. Routes 153-154 are not associated with TS5 and, as such, are not advertised.

Embodiments of the invention may enable a network device to advertise routes to peer network devices, once the network device has successfully programmed the routes, thus enabling the network device to send packets over these routes as soon as the routes have been programmed while eliminating the possibility of advertising routes that have not been programmed yet. Rather than advertising routes that the network device may not yet have successfully programmed, thus risking that packets directed to that route may be dropped, or excessively delaying the advertisement of routes to ensure that the routes have been programmed successfully, embodiments of the invention enable the network device to advertise subsets of routes, incrementally, as they are successfully programmed.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for route hardware programming in network devices, the method comprising:
   receiving, by a network device, route updates from a peer network device;
   selecting from the route updates, by a routing information base (RIB) agent, a set of selected routes to be used for routing;
   assigning, by the RIB agent, a plurality of timestamps to the set of selected routes,
   wherein an order of the timestamps in the plurality of timestamps reflects an order of the routes in the set of selected routes;
   programming, by the RIB agent, the set of selected routes into a software-implemented forwarding information base (FIB);
   segmenting, by a forwarding information base (FIB) agent, the set of selected routes in the software-implemented FIB into at least a first batch of routes and a second batch of routes,
   wherein a number of routes in each of the first and the second batches of routes is set based on an amount of time to write one or more entries;
   programming, by the FIB agent, the first batch of routes into a hardware-implemented FIB;
   after the programming,
   determining a last timestamp, wherein the last time stamp is the oldest timestamp of the plurality of timestamps where all routes associated with the last timestamp have been successfully programmed into the hardware-implemented FIB;
   sending to the RIB agent, by the FIB agent, the last timestamp; and
   advertising, by the RIB agent, all routes of the first batch that are associated with a timestamp that is no older than the last timestamp,
   wherein programming, by the FIB agent, the first batch of routes into the hardware-implemented FIB comprises writing the routes in the first batch into the hardware FIB in the order the routes in the first batch are stored in the first batch of routes.

2. The method of claim 1, wherein the plurality of timestamps comprises timestamps in ascending order, and wherein the timestamps in ascending order are assigned to the set of selected routes in sequential order.

3. The method of claim 2, wherein a timestamp of the plurality of timestamps is assigned to a single route in the set of selected routes.

4. The method of claim 2, wherein a timestamp of the plurality of timestamps is assigned to a subset of routes in set of selected routes.

5. The method of claim 2, wherein a timestamp of the plurality of timestamps is a time derived from a time base at the time the timestamp was applied.

6. The method of claim 2, wherein the plurality of timestamps is a sequence of increasing numbers.

7. The method of claim 1, further comprising:
   programming, by the FIB agent, the second batch of routes into the hardware-implemented FIB;
   reporting of routes of the second batch successfully programmed into the hardware-implemented FIB from the FIB agent to the RIB agent;
   advertising, by the RIB agent, routes of the second batch successfully programmed into the hardware-implemented FIB.

8. A network device comprising:
   a processor and memory;
   a routing information base (RIB) agent; and
   a forwarding information base (FIB) agent,
   wherein the network device receives route updates from a peer network device;
   wherein the RIB agent selects, from the route updates, a set of selected routes to be used for routing;
   wherein the RIB agent assigns a plurality of timestamps to the set of selected routes, and
   wherein an order of the timestamps in the plurality of timestamps reflects an order of the routes in the set of selected routes;
   wherein the RIB agent programs the set of selected routes into a software-implemented FIB;
   wherein the FIB agent segments the set of selected routes in the software-implemented FIB into at least a first batch of routes and a second batch of routes, and
   wherein a number of routes in each of the first and the second batches of routes is set based on an amount of time to write one or more entries;
   wherein the FIB agent programs the first batch of routes into a hardware-implemented FIB; and
   wherein, after the programming,
   the FIB agent determines a last timestamp, wherein the last time stamp is the oldest timestamp of the plurality of timestamps where all routes associated with the last timestamp have been successfully programmed into the hardware-implemented FIB;
   the FIB agent sends the last timestamp to the RIB agent; and
   the RIB agent advertises all routes of the first batch that are associated with a timestamp that is no older than the last timestamp,
   wherein the FIB agent programs the first batch of routes into the hardware-implemented FIB by writing the routes in the first batch into the hardware FIB in the order the routes in the first batch are stored in the first batch of routes.

9. The network device of claim 8,
   wherein the plurality of timestamps comprises timestamps in ascending order, and wherein the timestamps in ascending order are assigned to the set of selected routes in sequential order.

10. The network device of claim 8,
    wherein a timestamp of the plurality of timestamps is a time derived from a time base at the time the timestamp was applied.

11. The network device of claim 8,
    wherein the FIB agent further programs the second batch of routes into the hardware-implemented FIB;
    wherein the FIB agent further reports routes of the second batch successfully programmed into the hardware-implemented FIB to the RIB agent;

wherein the RIB agent further advertises routes of the second batch successfully programmed into the hardware-implemented FIB.

12. The network device of claim 8, wherein the network device is a router.

13. The network device of claim 8, wherein the network device is a multilayer switch.

14. A non-transitory computer readable medium comprising instructions, that enable a network device to:
- receive route updates from a peer network device;
- select from the route updates, by a routing information base (RIB) agent, a set of selected routes to be used for routing;
- assign, by the RIB agent, a plurality of timestamps to the set of selected routes,
- wherein an order of the timestamps in the plurality of timestamps reflects an order of the routes in the set of selected routes;
- program, by the RIB agent, the set of selected routes into a software-implemented forwarding information base (FIB);
- segment, by a forwarding information base (FIB) agent, the set of selected routes in the software-implemented FIB into at least a first batch of routes and a second batch of routes,
- wherein a number of routes in each of the first and the second batches of routes is set based on an amount of time to write one or more entries;
- program, by the FIB agent, the first batch of routes into a hardware-implemented FIB;
- after the programming,
- determine, by the FIB agent, a last timestamp, wherein the last time stamp is the oldest timestamp of the plurality of timestamps where all routes associated with the last timestamp have been successfully programmed into the hardware-implemented FIB;
- send to the RIB agent, by the FIB agent, the last timestamp; and
- advertise, by the RIB agent, all routes of the first batch that are associated with a timestamp that is no older than the last timestamp,
- wherein the instructions that enable the FIB agent to program the first batch of routes into the hardware-implemented FIB comprise instructions to write the routes in the first batch into the hardware FIB in the order the routes in the first batch are stored in the first batch of routes.

15. The non-transitory computer readable medium of claim 14,
- wherein the plurality of timestamps comprises timestamps in ascending order, and wherein the timestamps in ascending order are assigned to the set of selected routes in sequential order.

16. The non-transitory computer readable medium of claim 14,
- wherein a timestamp of the plurality of timestamps is a time derived from a time base at the time the timestamp was applied.

17. The non-transitory computer readable medium of claim 14, further comprising instructions, that enable a network device to:
- program, by the FIB agent, the second batch of routes into the hardware-implemented FIB;
- report routes of the second batch successfully programmed into the hardware-implemented FIB from the FIB agent to the RIB agent;
- advertise, by the RIB agent, routes of the second batch successfully programmed into the hardware-implemented FIB.

* * * * *